United States Patent
Dunlop et al.

(10) Patent No.: US 8,197,561 B2
(45) Date of Patent: Jun. 12, 2012

(54) PROCESS FOR DRYING COAL

(75) Inventors: Donald D. Dunlop, Austin, TX (US); Clinton B. Camper, Billings, MT (US); Vijay Sethi, Laramie, WY (US); Leon C. Kenyon, Jr., Baton Rouge, LA (US)

(73) Assignee: River Basin Energy, Inc., Highlands Ranch, CO (US)

( * ) Notice: Subject to any disclaimer, the term of this patent is extended or adjusted under 35 U.S.C. 154(b) by 170 days.

(21) Appl. No.: 12/566,174

(22) Filed: Sep. 24, 2009
(Under 37 CFR 1.47)

(65) Prior Publication Data
US 2010/0263269 A1    Oct. 21, 2010

Related U.S. Application Data (63) Continuation-in-part of application No. 11/316,508, filed on Dec. 22, 2005, now Pat. No. 7,695,535, which is a continuation-in-part of application No. 10/978,768, filed on Nov. 1, 2004, now Pat. No. 7,537,622, which is a continuation-in-part of application No. 09/974,320, filed on Oct. 10, 2001, now abandoned.

(60) Provisional application No. 61/212,668, filed on Apr. 14, 2009.

(51) Int. Cl.
*C10L 5/00* (2006.01)
(52) U.S. Cl. ............................................ 44/620; 44/626
(58) Field of Classification Search .................... 44/620, 44/626
See application file for complete search history.

(56) References Cited

U.S. PATENT DOCUMENTS

| | | | |
|---|---|---|---|
| 1,632,829 | A | 6/1927 | Fleissner |
| 1,960,917 | A | 5/1934 | Nagelvoort et al. |
| 2,197,792 | A | 4/1940 | Erickson |
| 2,204,781 | A | 6/1940 | Wattles |
| 2,610,115 | A | 9/1952 | Lykken |
| 2,811,427 | A | 10/1957 | Lykken |
| 3,047,473 | A | 7/1962 | Schmidt |
| 3,424,573 | A | 1/1969 | Catogio de Villiers |
| 3,687,431 | A | 8/1972 | Parks |
| 3,723,079 | A | 3/1973 | Seitzer |
| 3,896,557 | A | 7/1975 | Seitzer et al. |
| 3,961,914 | A | 6/1976 | Kindig et al. |
| 3,971,639 | A | 7/1976 | Matthews |
| 3,977,947 | A | 8/1976 | Pyle |

(Continued)

FOREIGN PATENT DOCUMENTS

CA    959783    12/1974

(Continued)

OTHER PUBLICATIONS

Official Action for U.S. Appl. No. 11/316,508, mailed Sep. 3, 2009.

(Continued)

*Primary Examiner* — Cephia D Toomer
(74) *Attorney, Agent, or Firm* — Sheridan Ross P.C.

(57) ABSTRACT

A process for drying coal is provided in which coal is passed into a fluidized bed reactor and heated to a predetermined temperature. The dried coal is then fed to a cooler where the temperature of the product is reduced to approximately 200 degrees Fahrenheit and water is added to further passivate the coal.

33 Claims, 8 Drawing Sheets

U.S. PATENT DOCUMENTS

| | | | |
|---|---|---|---|
| 3,985,516 | A | 10/1976 | Johnson et al. |
| 3,985,517 | A | 10/1976 | Johnson et al. |
| 3,997,422 | A | 12/1976 | Bull et al. |
| 4,043,763 | A | 8/1977 | Norman et al. |
| 4,045,187 | A | 8/1977 | Brink et al. |
| 4,052,169 | A | 10/1977 | Cole et al. |
| 4,071,151 | A | 1/1978 | Farber |
| 4,104,035 | A | 8/1978 | Cole et al. |
| 4,140,228 | A | 2/1979 | Hathaway et al. |
| 4,142,868 | A | 3/1979 | Genesoy et al. |
| 4,145,256 | A | 3/1979 | Bowen |
| 4,149,228 | A | 4/1979 | Adamson, Jr. |
| 4,170,456 | A | 10/1979 | Smith |
| 4,192,650 | A | 3/1980 | Seitzer |
| 4,203,727 | A | 5/1980 | Simpson |
| 4,213,752 | A | 7/1980 | Seitzer |
| 4,214,875 | A | 7/1980 | Kromrey |
| 4,226,371 | A | 10/1980 | Willams |
| 4,244,530 | A | 1/1981 | Halvorsen |
| 4,249,909 | A | 2/1981 | Comolli |
| 4,282,006 | A | 8/1981 | Funk |
| 4,300,291 | A | 11/1981 | Heard et al. |
| 4,301,746 | A | 11/1981 | Pech et al. |
| 4,309,192 | A | 1/1982 | Kubo et al. |
| 4,314,898 | A | 2/1982 | Nakako et al. |
| 4,324,544 | A | 4/1982 | Blake et al. |
| 4,329,929 | A | 5/1982 | Jessen |
| 4,341,530 | A | 7/1982 | Loth et al. |
| 4,353,427 | A | 10/1982 | Stock et al. |
| 4,430,963 | A | 2/1984 | Finet |
| 4,444,129 | A | 4/1984 | Ladt |
| 4,452,688 | A | 6/1984 | Mitchell et al. |
| 4,455,148 | A | 6/1984 | Nagata et al. |
| 4,461,624 | A | 7/1984 | Wong |
| 4,468,232 | A | 8/1984 | Funk |
| 4,470,878 | A | 9/1984 | Petrovic et al. |
| 4,486,894 | A | 12/1984 | Page et al. |
| 4,495,710 | A | 1/1985 | Ottoson |
| 4,497,122 | A | 2/1985 | Nelson et al. |
| 4,504,277 | A | 3/1985 | Scheffee |
| 4,510,040 | A | 4/1985 | Skinner et al. |
| 4,519,995 | A | 5/1985 | Schrofelbauer et al. |
| 4,529,407 | A | 7/1985 | Johnston et al. |
| 4,547,282 | A | 10/1985 | Schindler |
| 4,553,978 | A | 11/1985 | Yvan |
| 4,562,748 | A | 1/1986 | Mrochek et al. |
| 4,563,196 | A | 1/1986 | Seipenbusch |
| 4,571,174 | A | 2/1986 | Shelton |
| 4,575,418 | A | 3/1986 | Robbins |
| 4,596,650 | A | 6/1986 | Schindler et al. |
| 4,606,793 | A | 8/1986 | Petrovic et al. |
| 4,617,744 | A | 10/1986 | Siddoway et al. |
| 4,787,917 | A | 11/1988 | Leclerc de Bussy |
| 4,795,037 | A | 1/1989 | Rich, Jr. |
| 4,816,572 | A | 3/1989 | Bourgeois |
| 4,852,384 | A | 8/1989 | Woolbert et al. |
| 4,954,620 | A | 9/1990 | Bourgeois |
| 5,003,891 | A | 4/1991 | Kaneko et al. |
| 5,030,054 | A | 7/1991 | Reschly et al. |
| 5,033,208 | A | 7/1991 | Ohno et al. |
| 5,035,721 | A | 7/1991 | Atherton |
| 5,050,310 | A | 9/1991 | Jiles |
| 5,054,697 | A | 10/1991 | Provost |
| 5,087,269 | A | 2/1992 | Cha et al. |
| 5,103,743 | A | 4/1992 | Berg |
| 5,145,489 | A | 9/1992 | Dunlop |
| 5,156,686 | A | 10/1992 | Van Slyke |
| 5,171,474 | A | 12/1992 | Tono |
| 5,174,799 | A | 12/1992 | Garcia-Mallol |
| 5,197,398 | A | 3/1993 | Levy et al. |
| 5,199,185 | A | 4/1993 | Davidson |
| 5,213,635 | A | 5/1993 | Huang |
| 5,215,596 | A | 6/1993 | Van Slyke |
| 5,234,577 | A | 8/1993 | Van Slyke |
| 5,265,774 | A | 11/1993 | Stone |
| 5,269,947 | A | 12/1993 | Baskis |
| 5,322,530 | A | 6/1994 | Merriam et al. |
| 5,327,717 | A | 7/1994 | Hauk |
| 5,360,553 | A | 11/1994 | Baskis |
| 5,361,513 | A | 11/1994 | Woessner |
| 5,387,267 | A | 2/1995 | Warf et al. |
| 5,396,260 | A | 3/1995 | Adel et al. |
| 5,411,560 | A | 5/1995 | Mainwaring et al. |
| 5,442,919 | A | 8/1995 | Wilhelm |
| 5,444,733 | A | 8/1995 | Coassin et al. |
| 5,462,932 | A | 10/1995 | Brenner et al. |
| 5,471,955 | A | 12/1995 | Dietz |
| 5,477,850 | A | 12/1995 | Zegler et al. |
| 5,503,646 | A | 4/1996 | McKenny et al. |
| 5,517,930 | A | 5/1996 | Farwick et al. |
| 5,521,132 | A | 5/1996 | Talmy et al. |
| 5,527,365 | A | 6/1996 | Coleman et al. |
| 5,534,127 | A | 7/1996 | Sakai |
| 5,534,137 | A | 7/1996 | Griggs et al. |
| 5,537,941 | A | 7/1996 | Goidich |
| 5,543,061 | A | 8/1996 | Baskis |
| 5,546,875 | A | 8/1996 | Selle et al. |
| 5,547,549 | A | 8/1996 | Fraas |
| 5,556,436 | A | 9/1996 | Yagaki et al. |
| 5,562,884 | A | 10/1996 | Oakes et al. |
| 5,568,896 | A | 10/1996 | Adams et al. |
| 5,587,085 | A | 12/1996 | Yoon et al. |
| 5,601,692 | A | 2/1997 | Rinker et al. |
| 5,612,003 | A | 3/1997 | Heumann |
| 5,625,119 | A | 4/1997 | Tischler |
| 5,637,336 | A | 6/1997 | Kannenberg et al. |
| 5,730,775 | A * | 3/1998 | Meissner et al. ............... 75/436 |
| 5,830,246 | A | 11/1998 | Dunlop |
| 5,830,247 | A * | 11/1998 | Dunlop ............................ 44/626 |
| 5,832,848 | A | 11/1998 | Reynoldson et al. |
| 5,858,035 | A * | 1/1999 | Dunlop ............................ 44/626 |
| 5,904,741 | A * | 5/1999 | Dunlop et al. .................. 44/626 |
| 6,146,432 | A | 11/2000 | Ochs et al. |
| 6,162,265 | A | 12/2000 | Dunlop et al. |
| 7,537,622 | B2 * | 5/2009 | Dunlop et al. .................. 44/626 |
| 7,695,535 | B2 * | 4/2010 | Dunlop ............................ 44/626 |
| 2003/0221363 | A1 | 12/2003 | Reed |
| 2005/0188608 | A1 * | 9/2005 | Dunlop et al. .................. 44/620 |
| 2006/0096167 | A1 | 5/2006 | Dunlop |
| 2008/0223269 | A1 | 9/2008 | Paoluccio |
| 2009/0007484 | A1 | 1/2009 | Smith |
| 2009/0084029 | A1 | 4/2009 | Bergman |
| 2009/0250331 | A1 | 10/2009 | Hopkins et al. |
| 2009/0272027 | A1 | 11/2009 | Ruiters |

FOREIGN PATENT DOCUMENTS

| | | |
|---|---|---|
| DE | 569941 | 2/1933 |
| DE | 102005038135 | 3/2007 |

OTHER PUBLICATIONS

International Search Report for International (PCT) Application No. PCT/US10/49957, mailed Nov. 17, 2010.

Written Opinion for International (PCT) Application No. PCT/US10/49957, mailed Nov. 17, 2010.

Official Action and Search Report for European Application No. 11003257.0, mailed on Feb. 2, 2012, 8 pages.

\* cited by examiner

PROCESS FOR DRYING COAL

This application is a continuation-in-part of U.S. patent application Ser. No. 11/316,508, filed Dec. 22, 2005, now U.S. Pat. No. 7,695,523 which is a continuation-in-part of U.S. patent application Ser. No. 10/978,768 (the '768 application), now U.S. Pat. No. 7,537,622 filed Nov. 1, 2004, which is a continuation-in-part of abandoned U.S. patent application Ser. No. 09/974,320 (the '320 application), filed on Oct. 10, 2001, now abandoned and a continuation-in-part of the '320 application. This application also claims the benefit of U.S. Provisional Patent Application Ser. No. 61/212,668, filed Apr. 14, 2009. The entire disclosure of each of the identified patents and patent applications is hereby incorporated by reference herein.

FIELD OF THE INVENTION

A multi-stage process for drying coal in a fluidized bed reactor is provided. In addition, a process for drying and reducing the equilibrium moisture of coal in a fluidized bed reactor is provided. More specifically, the process of one embodiment includes cooling the coal product from the fluidized bed reactor and adding moisture up to the reduced equilibrium moisture of the product to reduce the tendency of the product to self heat.

BACKGROUND OF THE INVENTION

Many coals contain from about 15 to about 40 weight percent of moisture that not only does not add to the fuel value of the coal, but also increases the transport cost of the coal. Several United States patents have issued to the applicant for drying coal in a fluidized bed reactor. These include U.S. Pat. Nos. 5,830,246, entitled "Process for Processing Coal", 5,830,247 (the '247 patent), entitled "Process for Processing Coal", 5,858,035, entitled "Process for Processing Coal", 5,904,741, entitled "Process for Processing Coal", 6,162,265, (the '265 patent) entitled "Process for Processing Coal" and 7,537,622, entitled "Process for Drying Coal". The entire disclosure of each of these United States patents is hereby incorporated by reference into this specification.

The '265 patent is illustrative of these patents that teaches a process for preparing an irreversibly dried coal with a first fluidized bed reactor that includes a first fluidized bed with a fluidized bed density of from about 30 to about 50 pounds per cubic foot is maintained at a temperature of from about 480 to about 600 degrees Fahrenheit. Coal with a moisture content of about 15 to about 30 percent and a particle size such that all of the coal particles in such coal are in the range of from 0 to 2 inches is fed into the first fluidized bed. In addition, liquid phase water, inert gas, and air is fed into the first fluidized bed that is subjected, along with the coal, to a temperature of about 480 to about 600 degrees Fahrenheit for about 1 to about 5 minutes while simultaneously comminuting and dewatering said coal. This process produces coal of coarse fraction and a fine fraction. The fine fraction is sent to a cyclone wherein a portion of the fine fraction is removed and fed to a cooler that reduces the temperature of the fine fraction by at least about 300 degrees Fahrenheit. The comminuted and dewatered coal is then passed to a second fluidized bed reactor that includes a second fluidized bed with a fluidized bed density of about 30 to about 50 pounds per cubic foot and a temperature of about 215 to about 250 degrees Fahrenheit. Water, inert gas and oil of about 0.5 to about 3.0 weight percent of mineral oil having an initial boiling point of at least about 900 degrees Fahrenheit are also fed to the second fluidized bed. The temperature change experienced by the coal as it moves from the first fluidized bed reactor to the second fluidized bed reactor, from about 480 to about 600 degrees Fahrenheit to about 215 to about 250 degrees Fahrenheit, and associated processes occur in less than about 120 seconds.

The process described in the '265 patent works well with reactors with a diameter of less than about 4 feet, which generally have an output of about 200 tons per day. With larger reactors, wherein the output(s) often exceed 1,000 tons per day, the process is often not as efficient. Without wishing to be bound to any particular theory, it is believed that, as the size of the reactor increases, the gas velocity produced in the process increases geometrically, often to the point where the desired density of the fluidized bed used suffers. As the density of the fluidized bed declines, the efficiency of the drying process decreases.

It is thus a long felt need to provide an improved process for drying coal that is efficient with larger fluidized bed reactors.

SUMMARY OF THE INVENTION

It is one aspect of the present invention to process coal of high moisture content by employing a pre-drying step. Thus, in accordance with various embodiments of the present invention, a multi-stage process is provided for drying coal. In the first stage of the process, a coal with a moisture content of from about 15 to about 40 percent is heated in a first fluidized bed reactor at a temperature of between about 400 to about 650 degrees Fahrenheit until about 40 to about 60 percent of the water in such coal is removed and until at least about 50 percent of the particles less than about 400 microns are removed. During the first stage process, air is fed into the first fluidized bed reactor at a rate of from about 5 to about 8 feet per second.

In the second stage of the process, the coal treated by the first fluidized bed reactor is heated in a second fluidized bed reactor at a temperature up to about 250 degrees Fahrenheit until the coal contains less than 1 weight percent of water. In one embodiment, the temperature used in the second fluidized bed reactor is at least about 50 degrees greater than the temperature used in the first fluidized bed reactor. During the second stage process, air is fed into the second fluidized bed reactor at a rate less than that associated with the first fluidized bed reactor.

One of skill in the art will appreciate that although a pre-drying step that utilizes a fluidized bed reactor is contemplated, that other methods, may be employed to pre-dry the coal without departing from the scope of the invention. Furthermore, it will be appreciated that a pre-drying step may not be required.

It is another aspect of the present invention to both cool and add equilibrium moisture to the treated coal as it exits the second stage, or the initial drying stage if no pre-drying is required. It is desirable to add moisture to the processed coal to reduce the probability of post-drying combustion. Thus, one embodiment employs a fluid spray that cools the coal exiting the drying stage. The water also replaces at least a portion of the coals equilibrium moisture.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
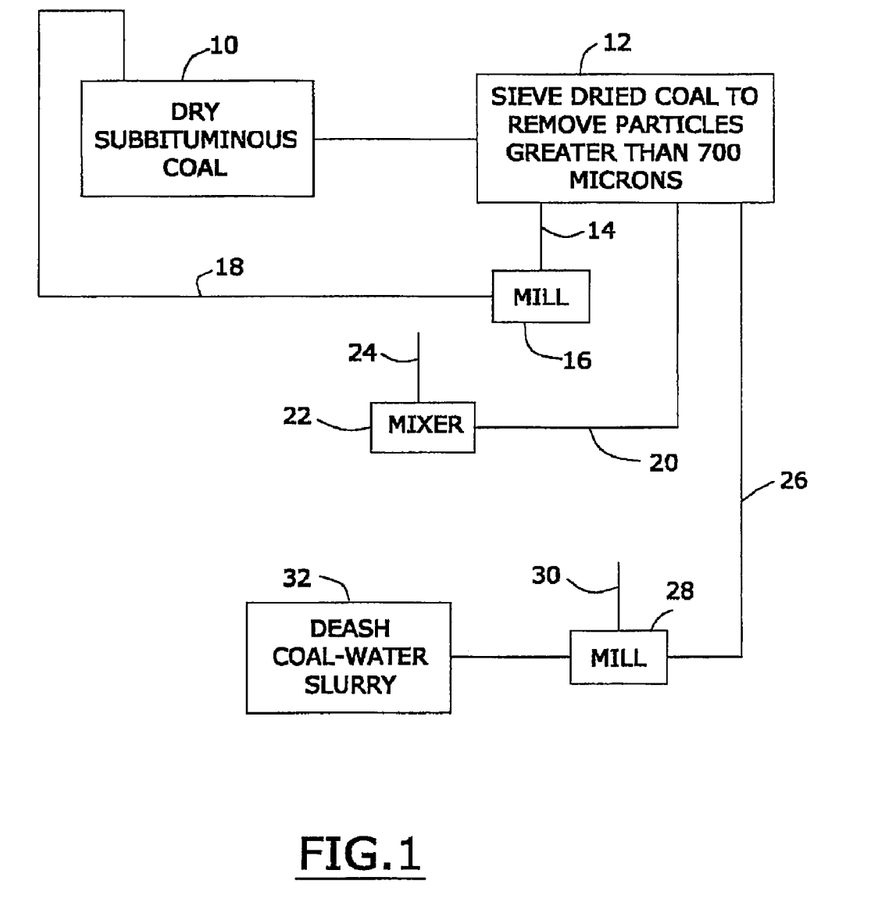
FIG. 1 is a schematic of one process for preparing a coal-water slurry.
Figure 2:
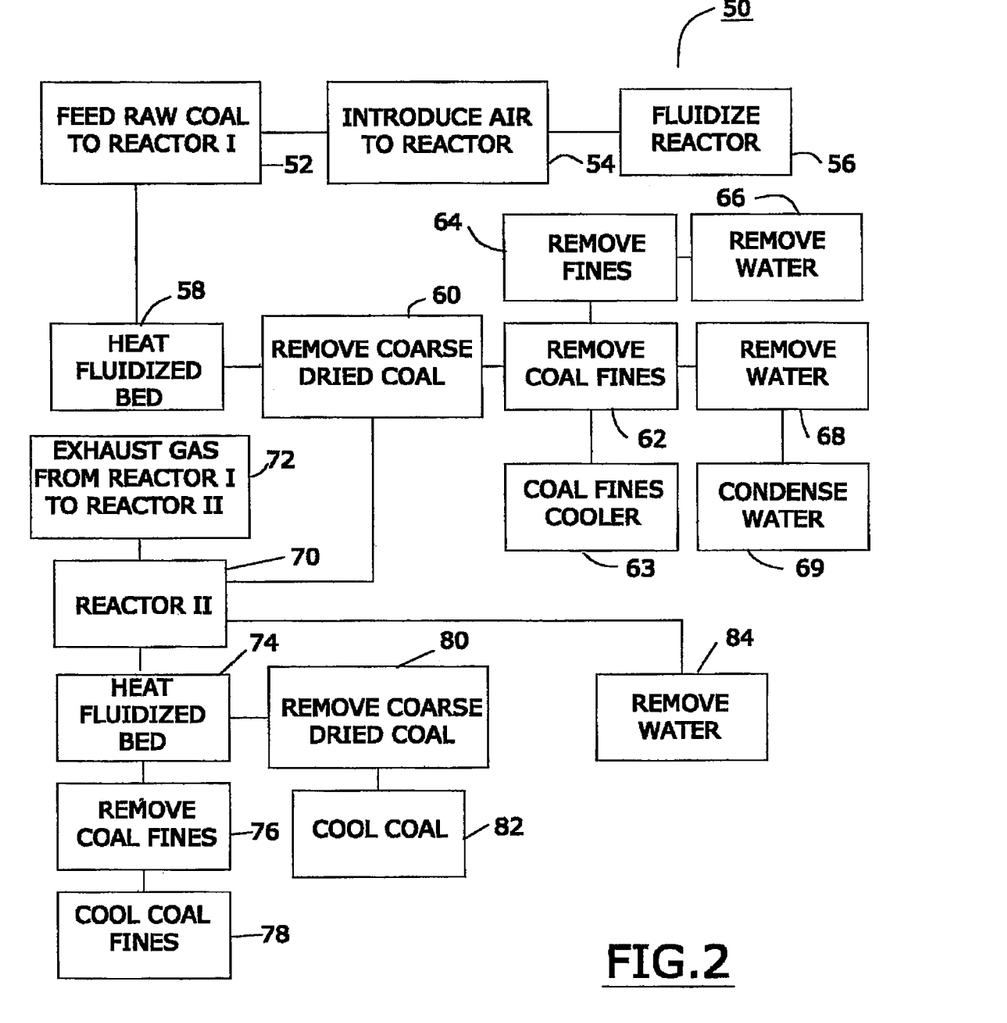
FIG. 2 is a schematic of one process for drying the coal used in the process of FIG. 1.

Referring now to FIGS. 1 & 2, a process for preparing a coal-water slurry and drying the same is shown. In order to remove water from coal, drying processes have been employed that utilize fluidized bed reactors. A fluidized bed reactor is a system wherein a fluid or gas is passed through a granular solid material at high velocities to suspend the solid and cause it to behave as if it were fluid (i.e. fluidization). In one embodiment, the coal used in the process of this specification is similar to the coal having about 5 to about 30 weight percent of moisture and, more preferably about 10 to about 30 weight percent of moisture. However, in the instant case, the coal used may often contain up to about 40 weight percent of water. The moisture content of coal may be determined by conventional means in accordance with standard A.S.T.M. testing procedures. Methods for determining the moisture content of coal are well known in the art; see, e.g., U.S. Pat. Nos. 5,527,365 (irreversible drying of carbonaceous fuels), 5,503,646, 5,411,560 (production of binderless pellets from low rank coal), 5,396,260, 5,361,513 (apparatus for drying and briquetting coal), 5,327,717, and the like. The entire disclosure of each of these United States patents is hereby incorporated by reference herein.

In one embodiment of the present invention, the coal used in the process of this invention contains from about 10 to about 25 percent of combined oxygen. For example, the coal used in the process of FIG. 1 contains from about 10 to about 20 weight of combined oxygen, in the form, e.g., of carboxyl groups, carbonyl groups, and hydroxyl groups. As used herein, the term "combined oxygen" means oxygen which is chemically bound to carbon atoms in the coal. See, e.g., H. H. Lowry, editor, "Chemistry of Coal Utilization" (John Wiley and Sons, Inc., New York, N.Y., 1963) . . . . The combined oxygen content of such coal may be determined, e.g., by standard analytical techniques; see, e.g., U.S. Pat. Nos. 5,444, 733, 5,171,474, 5,050,310, 4,852,384 (combined oxygen analyzer), 3,424,573, and the like. The disclosure of each of these United States patents is hereby incorporated by reference into this specification.

In one embodiment of the present invention, the coal used in the process of the instant invention contains about 10 to about 25 weight percent of ash. In one embodiment, the coal charged to feeder 12 contains at least about 10 weight percent of ash. As used herein, the term "ash" refers to the inorganic residue left after the ignition of combustible substances; see, e.g., U.S. Pat. Nos. 5,534,137 (high ash coal), 5, 521, 132 (raw coal fly ash), 4, 795,037 (high ash coal), 4,575,418 (removal of ash from coal), 4,486,894 (method and apparatus for sensing the ash content of coal), and the like. The disclosure of each of these United States patents is hereby incorporated by reference into this specification. By way of further illustration, one suitable ash containing coal which may be used in this embodiment is Herrin number 6 coal, from Illinois.

The coal produced by the process of U.S. Pat. No. 5,830, 246, when subbituminous coal is used as the starting material, has a particle distribution that renders it unsuitable for making a stable slurry. When this coal is mixed with from about 25 to about 35 weight percent of water (by total weight of water and coal), the slurry thus produced is unstable. It is thus an object of one embodiment of this invention to provide a stable coal-water slurry made from subbituminous coal, wherein said slurry has a solids content of at least about 65 weight percent and a heating value that is at least about 80 percent of the heating value of the undried coal.

Referring to FIG. 1, in step 10 subbituminous coal is dried to a moisture content of less than about 5 percent. In one embodiment, the process of U.S. Pat. No. 5,830,246 is utilized to dry such coal. A drying process for preparing an irreversibly dried coal is used wherein a fluidized bed reactor is provided that has a fluidized density of about 10 to about 40 pounds per cubic foot. The fluidized bed reactor is maintained at a temperature of about 400-650 degrees Fahrenheit while coal with a moisture content of about 5 to about 30 percent and a combined oxygen content of from about 10 to about 20 percent is feed thereto. In addition, mineral oil with an initial boiling point of at least about 900 degrees Fahrenheit is fed into the reactor about 0.5 to about 3.0 percent by weight of dried coal, thereby producing a coated coal. The coated coal is then held at a temperature from about 400-650 degrees Fahrenheit in said reactor for about 1 to about 5 minutes while simultaneously comminuting and dewatering the coated coal. After the coated coal is exposed to an ambient environment at about 25 degrees Centigrade (about 77 degrees Fahrenheit) and a relative humidity of 50 percent, the coated coal contains less than about 2.0 percent of moisture by weight of coal, at least about 80 weight percent of the particles of said coated coal are smaller than 74 microns, and the coal has a combined oxygen content of from about 10 to about 20 weight percent.

In another embodiment, the process the '247 patent is used in order to prepare the dried subbituminous coal. More specifically, one embodiment of the present invention employs a process for preparing an irreversibly dried coal with a first fluidized bed reactor with a fluidized bed density of about 20 to about 40 pounds per cubic foot, wherein the reactor is maintained at a temperature of about 150 to about 200 degrees Fahrenheit. Coal with a moisture content of about 15 to about 30 percent, an oxygen content of about 10 to about 20 percent, and a particle size such that all of the coal particles in such coal are in the range of from 0 to 2 inches are fed into the reactor. The coal in the reactor is then subjected to a temperature of about 150 to about 200 degrees Fahrenheit for about 1 to about 5 minutes while simultaneously comminuting and dewatering the coal. The comminuted and dewatered coal is then passed to a second fluidized bed reactor with a fluidized bed density of about 20 to about 40 pounds per cubic feet, wherein the reactor is at a temperature of about 480 to about 600 degrees Fahrenheit. The second fluidized bed reactor is also fed mineral oil with an initial boiling point of at least about 900 degrees Fahrenheit of about 0.5 to about 3.0 weight percent by weight of dried coal, thereby producing a coated coal. The coated coal is subjected to a temperature of about 480 to about 600 degrees Fahrenheit for about 1 to about 5 minutes while simultaneously comminuting and dewatering the coated coal, whereby a comminuted and dehydrated coal is produced.

The use of a particular subbituminous coal with specified properties, the drying step 10 is critical in order to obtain a stable slurry. It should be noted that other coals often do not require such a drying step in order to produce a stable slurry. For example, by way of illustration and not limitation, U.S. Pat. No. 4,282,006, (the '006 patent), the entire disclosure of which is hereby incorporated by reference herein, discloses the preparation of a 75 weight percent coal-water slurry using coal from the Black Mesa mine is described (see Example 3). The properties and chemical composition of such coal, however, is not described in the '006 patent. Without wishing to be bound to any particular theory, it is believed that the Black Mesa coal does not have a combined oxygen content of from about 10 to about 25 percent. If the Black Mesa coal did have such an oxygen content, one of skill in the art would not have been able to make a stable slurry by drying. It has been discovered that, when coal with an oxygen content of about 10 to about 25 percent is mixed with a sufficient amount of water to produce a slurry with a solids content of about 65 to about 75 weight percent, such slurry is often not stable. When such coal is first dried and then modified, in accordance with the process of FIG. 1, a stable slurry may often be made from such coal.

Referring again to FIG. 1, after the dried coal has been produced in step 10, it is subject to a sieving operation in step 12 to remove oversize particles. For example, in such an operation all particles greater than about 700 microns are removed. In another embodiment, all particles greater than about 500 microns are removed. The oversize particles are then fed via line to a mill 16, wherein they are ground and then recycled via line 18 to the dry subbituminous coal supply 10. The undersize particles are fed via line 20 to a mixer 22 wherein a sufficient amount of water is added via line 24 to produce a coal/water mixture with a solids content by weight of dry coal of about 65 to about 75 weight percent. Additionally, a dispersing agent and/or an electrolyte may be added in accordance with the process described in the '006 patent. The sieved, dried coal is then fed via line 26 to a mill 28, for example, a ball mill, in which the coal is ground to the particle size distribution described in the '006 patent. In particular, the coal is ground until at least about 5 weight percent of its particles are of colloidal size, and until a coal compact is produced that is described by the "CPFT" formula set forth in claim 1 the '006 patent. One of skill in the art will appreciate that one or more other coal compacts may be added to the mill 28 via a line 30, and/or water and/or surfactant and/or electrolyte may be added.

In one embodiment, the coal-water slurry produced in the mill 28 is also deashed 32. In one embodiment, the deashing process described in U.S. Pat. No. 4,468,232 is used, the entire disclosure of which is hereby incorporated by reference herein.

One embodiment of the present invention employs a process for preparing a clean coal-water slurry wherein a coal-water mixture comprised of, about 60 to about 80 volume percent of solids that are grinded until a coal-water slurry is produced. The contemplated slurry has a yield stress of about 3 to about 18 Pascals and a Brookfield viscosity at a solids content of 70 volume percent at ambient temperature and pressure, and a shear rate of 100 revolutions per minute of less than 5,000 centipoise. The slurry is comprised of a consist of finely divided particles of coal dispersed in water wherein the specific surface area of about 0.8 to about 4.0 square meters per cubic centimeter and an interstitial porosity of less than about 20 volume percent. Furthermore, about 5 to about 70 weight percent of said finely divided particles of coal in the water are of colloidal size, being smaller than about 3.0 microns. In addition, finely divided particles of coal has a particle size distribution substantially in accordance with the following formula:

$$\frac{CPFT}{100} = \sum_{j=1}^{k} \left[ Xj \left( \frac{D^{Nj} - D_{sj}^{Nj}}{D_{Lj}^{Ni} - D_{sj}^{Nj}} \right) \right]$$

$$\text{where } \sum_{j=1}^{k} Xj = 1.0$$

$$\text{and where if } D < D_{sj} \left( \frac{D^{Nj} - D_{sj}^{Nj}}{D_{Lj}^{Ni} - D_{sj}^{Nj}} \right) = 0.0$$

$$\text{and where if } D > D_{Lj} \left( \frac{D^{Nj} - D_{sj}^{Nj}}{D_{Lj}^{Ni} - D_{sj}^{Nj}} \right) = 1.0$$

wherein:

(a) CPFT is the cumulative percent of said solid carbonaceous material finer than a certain specified particle size D, in volume percent;

(b) k is the number of component distributions in the compact and is at least 1;

(c) Xj is the fractional amount of the component j in the compact, is less than or equal to 1.0, and the sum of all of the Xj's in the consist is 1.0;

(d) N is the distribution modulus of fraction j and is greater than about 0.001;

(e) D is the diameter of any particle in the compact and ranges from about 0.05 to about 1180 microns;

(f) Ds is the diameter of the smaller particle in fraction j, as measured at 1% CPFT on a plot of CPFT versus size D, is less than DL, and is greater than 0.05 microns; and (g) DL is the diameter of the size modulus in fraction j, measured by sieve size or its equivalent, and is from about 15 to about 1180 microns.

In one embodiment, at least about 85 weight percent of the coal particles in the consist have a particle size less than about 300 microns. Finally, the net zeta potential of said colloidal sized particles of coal is about 15 to about 85 millivolts. The coal is cleaned after the cool water slurry is produced.

FIG. 2 is a flow diagram of a multi stage process 50 for drying coal of one embodiment. The coal used in process 50 is similar to the coal described in column 1 (see lines 16-61 of column 3) of the '265 patent, with the exception that it preferably contains from about 15 to about 40 weight percent of moisture, may contain from about 10 to about 25 weight percent of combined oxygen, and may contain from about 10 to about 25 weight percent of ash.

Furthermore, coal used in process 50 may be lignitic or sub-bituminous coal. Thus, and as is disclosed at lines 62 et seq. of column 3 of the '265 patent. These coals are also described in U.S. Pat. No. 5,145,489, the entire disclosure of which is hereby incorporated by reference into this specification. In one embodiment, the coal used in step 52 is 2" 0", and more preferably, 2" by ¼" or smaller. As is known to those skilled in the art, 2" by ¼" coal has all of its particles within the range of about 0.25 to about 2.0 inches. Crushed coal conventionally has an about 2" 0" to 3"×0" particle size distribution. This crushed coal can advantageously be used in at least some of the process disclosed herein.

Figure 3:
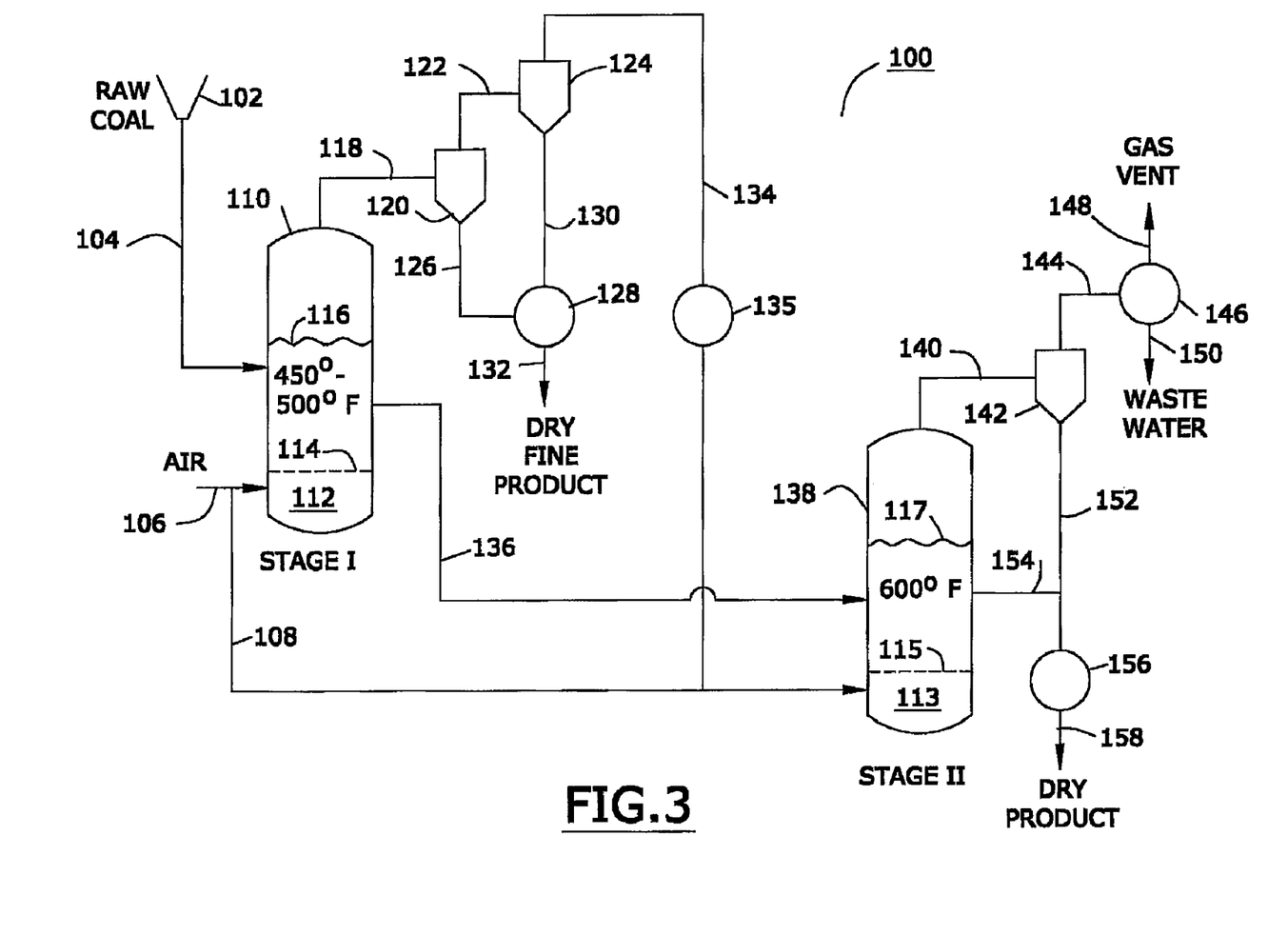
FIG. 3 is a schematic of one apparatus that may be used in the process of FIG. 2.
Figure 4:
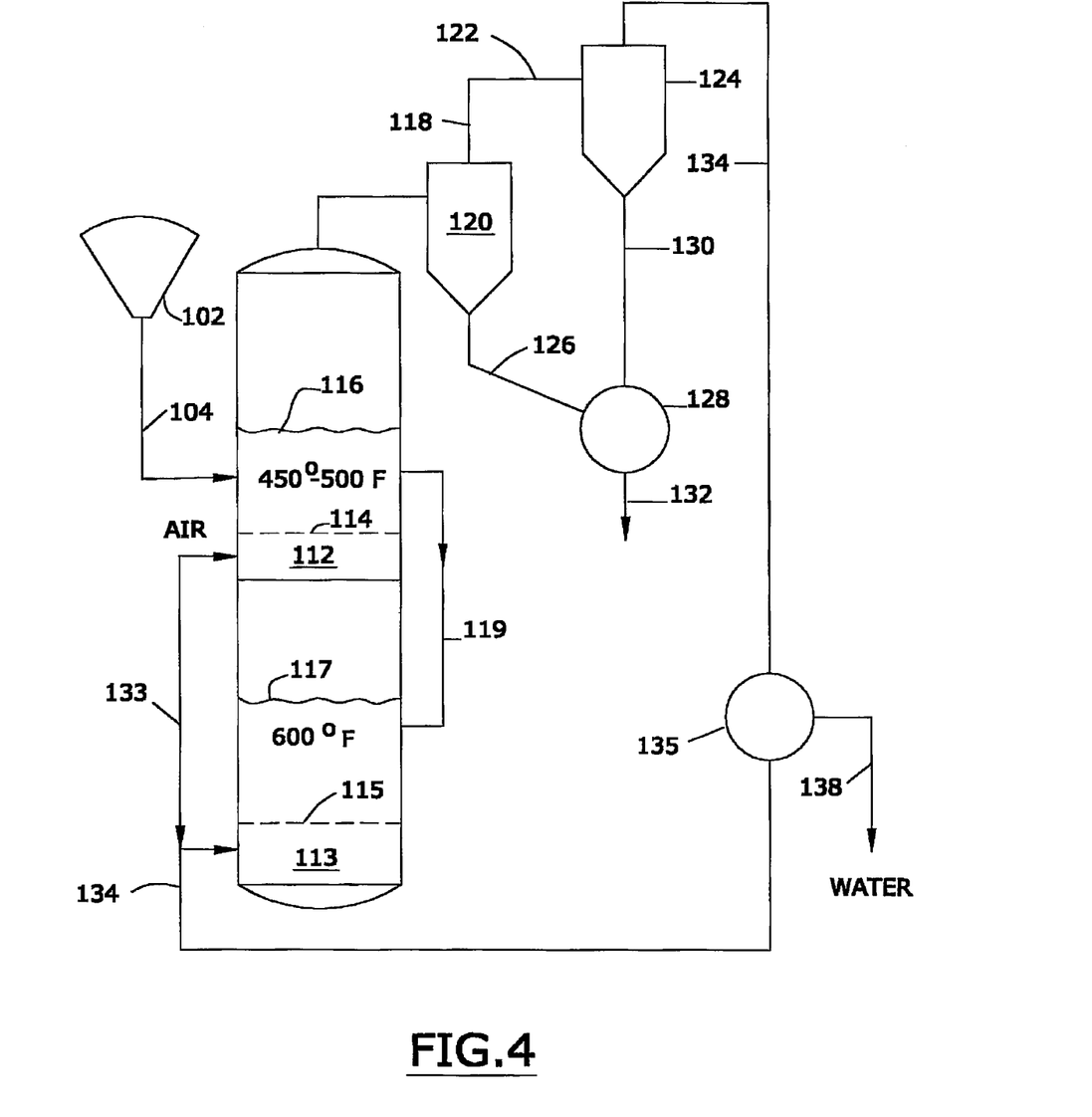
FIG. 4 is a schematic of another preferred apparatus that may be used in the process of FIG. 2.

Initially, raw coal is fed into a first reactor and is shown as step 52 wherein the raw coal is preferably fed from a feeder 102 (see FIG. 3; also see FIG. 4). The feeder 102 may be similar to, or identical to the feeder 12 described in the '265 patent, i.e., any coal feeder commonly used in the art. Thus, e.g., one may use one or more of the coal feeders described in U.S. Pat. Nos. 5,265,774, 5,030,054 (mechanical/pneumatic coal feeder), U.S. Pat. No. 4,497,122 (rotary coal feeder), U.S. Pat. Nos. 4,430,963, 4,353,427 (gravimetric coal feeder), U.S. Pat. Nos. 4,341,530, 4,142,868 (rotary piston coal feeder), U.S. Pat. No. 4,140,228 (dry piston coal feeder), U.S. Pat. No. 4,071,151 (vibratory high pressure coal feeder with helical ramp), U.S. Pat. No. 4,149,228, and the like. The disclosure of each of these United States patents is hereby incorporated by reference into this specification. The feeder of one embodiment is comprised of a hopper and a star feeder. It is also contemplated that feeder be capable of continually delivering coal to fluidized bed. The star feeder is a metering device that may be, operated by a controller that controls the rate of coal removal from a hopper; see, e.g., U.S. Pat. No. 5,568,896, the entire disclosure of which is hereby incorporated by reference into this specification.

Referring now to FIGS. 2 and 3, and in step 54 thereof, air is introduced into the first fluidized bed reactor 110 via line 106. The air may be introduced by conventional means such as, e.g., a blower (not shown). In one embodiment, the air so introduced is hot air at a temperature of about 250 to about 400 degrees Fahrenheit, and preferably of about 300 to about 350 degrees Fahrenheit. The air is introduced via line 106 into a fluidized bed 112 in order to maintain the temperature of such fluidized bed 112 at a temperature of about 300 to about 550 degrees Fahrenheit and, preferably of about 450 to about 500 degrees Fahrenheit. Without wishing to be bound to any particular theory, it is believed that this hot air helps oxidize a portion of the coal in the first reactor 110, thereby supplying energy required to vaporize the water in such coal. It is also believed that this oxidation occurs on the most reactive sites on the coal which reduces the natural equilibrium moisture thereof. Equilibrium moisture is defined as the amount of water that will chemically combine with the coal and is measured by ASTM procedure D 1412. Reducing the equilibrium moisture of the coal reduces the amount of water the coal can absorb from the environment which reduces the tendency to self-heat that can result in spontaneous combustion of the coal.

In one embodiment of the present invention, the air is introduced via line 106 into fluidized bed 112 at a fluidizing velocity in the reactor vessel of greater than about 4 feet per second; the air is injected and preferably greater than about 5 feet per second. In one aspect of this embodiment, the air is introduced via line 106 at a fluidizing velocity of from about 5 to about 8 feet per second. In another aspect of this embodiment, the air is introduced via line 6 at a fluidizing velocity of from about 6 to about 8 feet per second. Without wishing to be bound to any particular theory, it is believed that maintaining the air flow within the desired ranges is essential for maintaining the desired conditions within the fluidized bed 112 and for conducting an efficient drying operation.

In step 56 of the process, the reactor 110 is fluidized, i.e., a fluidized bed is established therein. One may establish such a fluidized bed by conventional method such as, e.g., the method disclosed in the '265 patent. In one embodiment, the fluidized bed 14 is provided in a reactor vessel 10 and is comprised of a bed of fluidized coal particles, and it preferably has a density of from about 20 to about 40 pounds per cubic foot. In one embodiment, the density of the fluidized bed 20 is from about 20 to about 30 pounds per cubic foot. The fluidized bed density is the density of the bed while its materials are in the fluid state and does not refer to the particulate density of the materials in the bed. The fluidized bed may be provided by any of the means well known to those skilled in the art. Reference may be had, e.g., to U.S. Pat. Nos. 5,145, 489, 5,547,549, 5,546,875 (heat treatment of coal in a fluidized bed reactor), U.S. Pat. No. 5,197,398 (separation of pyrite from coal in a fluidized bed), U.S. Pat. No. 5,087,269 (drying fine coal in a fluidized bed), U.S. Pat. No. 4,571,174 (drying particulate low rank coal in a fluidized bed), U.S. Pat. No. 4,495,710 (stabilizing particulate low rank coal in a fluidized bed), U.S. Pat. No. 4,324,544 (drying coal by partial combustion in a fluidized bed), and the like. In the process of this instant invention, air is fed into the fluidized bed to heat the fluidized bed and to maintain the bed at the desired density. Without wishing to be bound to any particular theory, it is believed that, in order to efficiently maintain the fluidized bed 112 at the desired density, the air flow into the fluidized bed should preferably be from about 5 to about 8 feet per second. Air flow outside of these ranges may not yield the desired results.

The reactors 110 and 138 are often cylindrical and may be large when used with one-stage processes and often require gas velocities of about 18 feet per second or more. Without wishing to be bound to any particular theory, it is believed that velocities of this magnitude often result in excessive entrainment of the fluidized bed and/or may distort the fluidization in the fluidized bed. In any event, velocities of this magnitude do not produce the drying results obtained by embodiments of the present invention.

In step 58, the fluidized bed 112 is heated by conventional means such as, e.g., using hot air provided in another reactor (not shown) and/or another device. Thus, e.g., one may provide the hot air to line 106 from a separate fluidized bed reactor. The fluidized bed is preferably maintained at a temperature of about 150 to about 200 degrees Fahrenheit. In a more preferred embodiment, the fluidized bed 14 is maintained at a temperature of about 165 to about 185 degrees Fahrenheit. Various means may be used to maintain the temperature of fluidized bed 14 at a temperature of from about 150 to about 200 degrees Fahrenheit. Thus, e.g., one may use an internal or external heat exchanger (not shown). See, e.g., U.S. Pat. Nos. 5,537,941, 5,471,955, 5,442,919, 5,477,850, 5,462,932, and the like. In one embodiment, hot gas from, e.g., a separate fluidized bed reactor 18 is fed via line 20 into fluidized bed 14. This hot gas preferably is at temperature of about 480 to about 600 degrees Fahrenheit and, more preferably, at a temperature of about 525 to about 575 degrees Fahrenheit. In another embodiment the air fed via line 6 is hot air provided by a heat exchanger, not shown. Thus, e.g., one may use an internal or external heat exchanger (not shown). See, e.g., U.S. Pat. Nos. 5,537,941, 5,471,955, 5,442,919, 5,477,850, 5,462,932, and the like; the entire disclosure of each of these United States patents is incorporated by reference herein.

It will be seen that a portion of the air fed via line 106 is diverted via line 108 into reactor 138, thereby effecting step 74 (the heating of the fluidized bed 113 in reactor 138). The air fed into reactor 113 is preferably fed at a velocity of from about 8 to about 12.2 feet per second. Without wishing to be bound to any particular theory, it is believed that this rate of air flow in reactor 138 is essential to maintain the fluidized bed under the desired conditions and to obtain the desired efficiency of drying; the use of lower or higher air flow velocities is undesirable and ineffective.

In step 62 of the process, coal "fines" are removed from the reaction mass disposed within the fluidized bed 112. The finer coal portions (i.e., those with a particle size less than about 400 microns) are entrained from the top 116 of the fluidized bed to the cyclone 120 via line 118. The coarser component of the entrained stream will preferably be cooled in cooler 128, as are the coarser components from cyclone 124. The finer fraction from cyclone 120 is preferably passed via line 122 to cyclone 124. The coarser component from cyclone 124 is then fed to cooler 128 and the fraction so cooled is then passed to storage 132. The exhaust gas fed via line 134 is blended with the air in line 108 and the blended hot gases are then fed into the reactor 138. One may use any of the cyclones conventionally used in fluid bed reactors useful for separating solids from gas. Thus, e.g., one may use as cyclone, the cyclones described in U.S. Pat. No. 5,612,003 (fluidized bed with cyclone), U.S. Pat. No. 5,174,799 (cyclone separator for a fluidized bed reactor), U.S. Pat. Nos. 5,625,119, 5,562,884, and the like. The entire disclosure of each of these United States patents is hereby incorporated by reference herein.

Water in reactor 110 is removed from the coal fed via line 104. This step is also indicated, as step 68, in FIG. 2. The raw coal fed via line 104 of one embodiment contains from about 15 to about 40 weight percent of water. By comparison, the coal withdrawn via line 136 contains about 40 to about 60 percent less water. Put another way, the ratio of the water concentration in the raw coal divided by the water concentration in the dry coal is at from about 1.6 to about 2.5. The water removed from the coal within the reactor 110 is passed together with flue gas and fines via line 118 to cyclone 120 and thence, via line 122 to cyclone 124. Thereafter, it passes via line 134 to condenser 135, wherein it is removed. The gas passing from condenser is preferably substantially dry, containing less than about 5 weight percent of water. Thereafter, this dry gas is mixed with the air in line 108 and thence fed into the fluidized bed 113 as its fluidizing medium. The raw coal from feeder 102 is maintained in reactor 110 for a time sufficient to remove from about 40 to about 60 weight percent of the water in the raw coal. Generally, such "residence time" is preferably less than about 15 minutes and frequently is from about 5 to about 12 minutes.

In step 60, the dried coal from reactor 110 is removed from such reactor and fed into reactor 138 via line 136. Simultaneously, or sequentially, in step 72 exhaust gas is fed via line 108 from line 106, and is preferably mixed with dry gas from condenser 135, and it is then fed into fluidized bed 113.

In step 74 of the process, the fluidized bed 113 is heated to a temperature that preferably is at least about 50 degrees Fahrenheit, higher than the temperature at which fluidized bed 112 is maintained. The temperature in fluidized bed 113 preferably is about 450 to about 650 degrees Fahrenheit and, more preferably, about 550 to about 600 degrees Fahrenheit. The fluidized bed 113 is preferably heated by both the hot coal fed via line 136, and/or the heat in the gas fed via line 108, and/or the combustion processes involved in said fluidized bed (often referred to as "off gas"). In a manner similar to that depicted for reactor 110, water is removed from the coal in fluidized bed 113, and such coal is then discharged via line 154; in general, the water content of such coal is preferably less than about 1 weight percent.

The water removed from the coal in reactor 138 is fed via line 140 (together with "fines" and as) to cyclone 142 and thence via line 144 to a condenser 146; the waste water from condenser 146 is then removed via line 150. This step is depicted as step 84 in FIG. 2.

In step 76, the fines are removed from the reactor 138 via line 140. The solid product from cyclone 142 is then fed via line 152 and preferably blended with the dry coal from line 154. The blend is then fed to cooler 156, wherein it is preferably cooled to a temperature less than 200 degrees Fahrenheit. In one embodiment, FIG. 5, cooling is accomplished by immediately subjecting the product as it exits the fluid bed to a water spray of sufficient quantity to cool the blend and replace a portion of the blend's equilibrium moisture. In another embodiment, only a portion of the needed water is added at the exit of the reactor and the remaining amount is added in the cooler. This cooler could be any number devices that facilitate adding water and mixing the product e.g. a mixing screw conveyor as manufactured by Austin Mac, Inc. 2739 6$^{th}$ Avenue South, Seattle, Wash. In another embodiment, all of the cooling and equilibrium moisture addition occurs in the cooler. In another embodiment, a cooler that incorporates indirect cooling surfaces such as a hollow flight screw conveyor as manufactured by the Therma-Flite Company of 849 Jackson Street, Benica, Calif. 94510 or a Roto-Tube cooler as manufactured by FMC Corporation of 400 Highpoint Drive Chalfont, Pa. 18914 is used to cool the product before water is added to replace a portion of the equilibrium moisture. After cooling the blend is fed via line 158 to storage.

FIG. 4 is a schematic of a preferred apparatus which is similar to the apparatus depicted in FIG. 2 but utilizes a single, compartmentalized vessel instead of the two reactor vessels 110 and 138.

Figure 5:
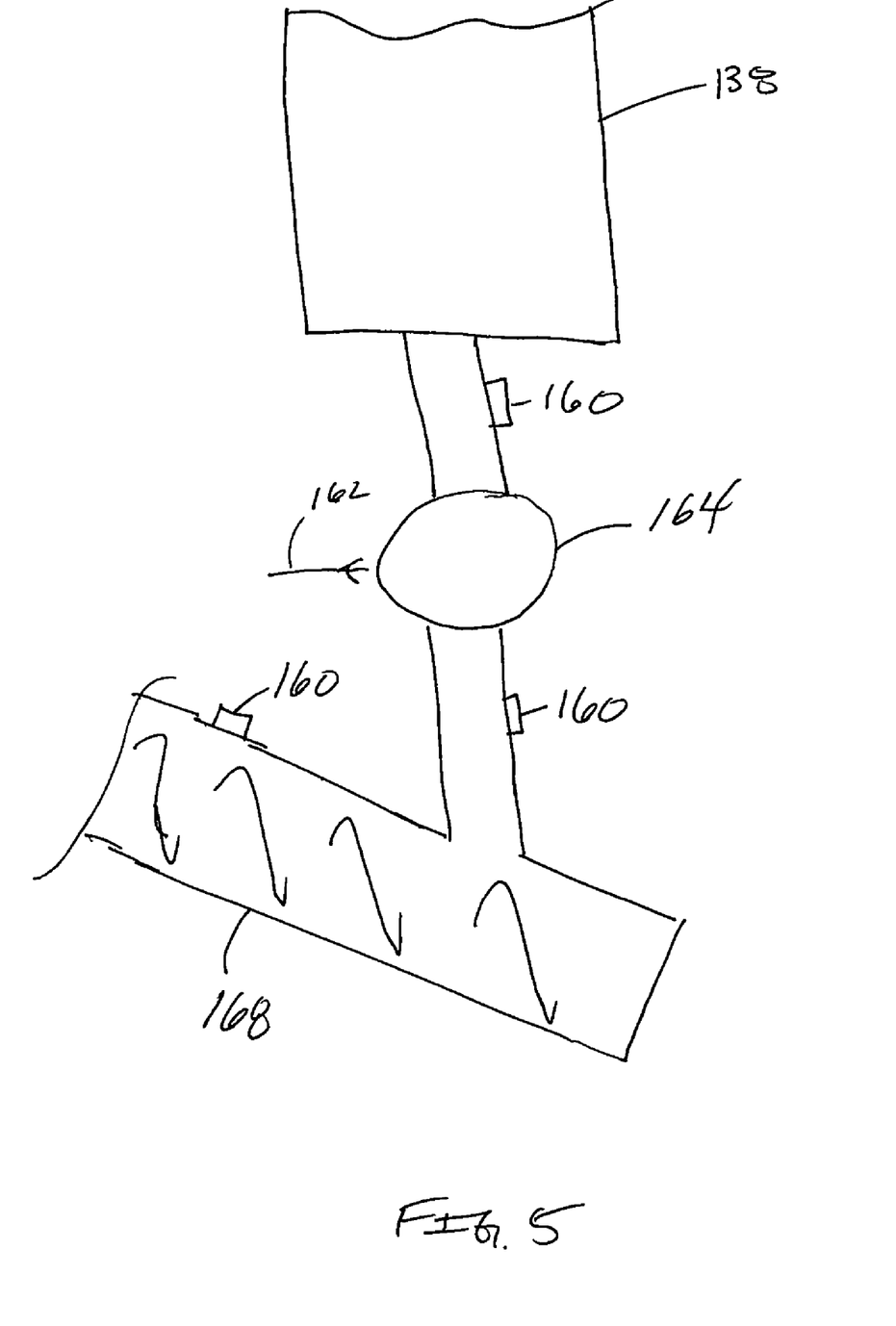
FIG. 5 is a schematic of another embodiment of the present invention for cooling by immediately subjecting a product as it exits the fluid bed to a water spray of sufficient quantity to cool the blend and replace a portion of the blend equilibrium moisture.

FIG. 5 is an alternate embodiment of the present invention wherein the coal product is cooled after it exits the second fluidized bed 38. The temperature of the coal product is sensed by a temperature sensor 160 as the coal is directed to a water spray 102 that cools the coal product to a temperature less than the ambient boiling point of water (212 degrees Fahrenheit at sea level). The water spray may be continuous and/or be selectively controlled by a rotary valve 164 motor that is indexed to open a solenoid valve to inject water. The temperature of the coal product is also sensed by sensor 160 after being cooled. The coal may be further cooled in a screw 168, which will be described in further detail below with reference to FIGS. 6-8. The contemplated temperature sensors can be any temperature sensing device, but, preferably an optical sensor. One of skill in the art will appreciate that although one embodiment employs water to cool the coal other cooling techniques may be employed, such as direct contact cooling that may use an inert gas or a heat exchanger, without departing from the scope of the invention.

Figure 6:
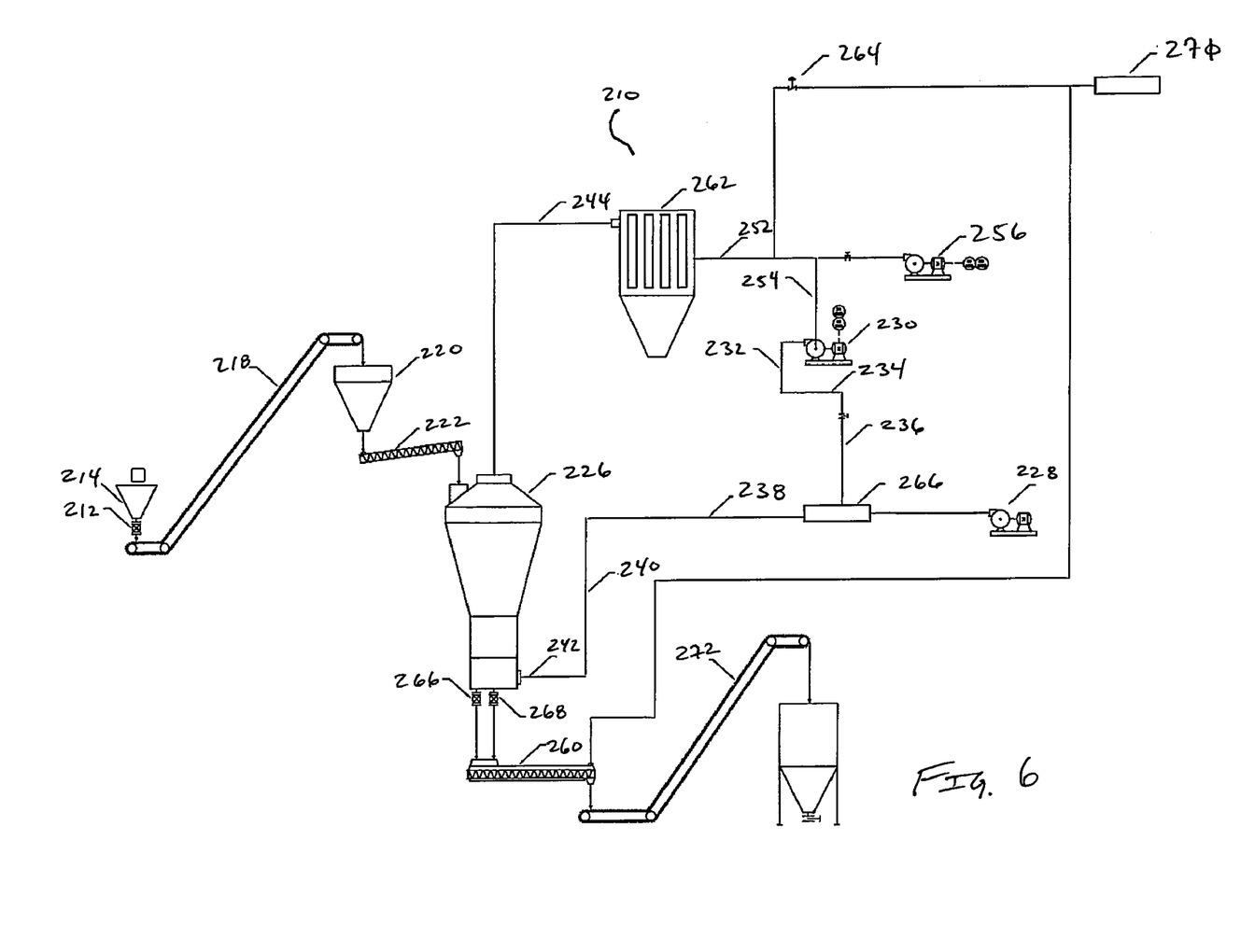
FIG. 6 is a schematic of one process for drying coal.

FIG. 6 is a schematic of a preferred coal drying system 210 wherein feed coal is received at the site of the system 210 by railcar, by truck, or in Super Sacks. The feed coal may contain, e.g., up to about 40 weight percent of moisture. In one embodiment, the coal used in the process and system has an equilibrium moisture of about 18 to about 26 percent. The term equilibrium moisture is the amount of moisture in the coal that is bonded to the atoms in the coal and is measured by ASTM procedure D1412. The coal is fed into feed hopper 214. In one embodiment, the feed hopper 214 is a custom feed hopper equipped with a 6 inch Plattco rotary valve 212 (manufactured by the Plattco Corporation of 7 White Street, Plattsburgh, N.Y. 12901) at its bottom that is adapted to controllably feed coal to the feed conveyor 218. In one aspect of this embodiment, valve 212 is connected via a link (not shown) to a controller (not shown). In another embodiment, the coal is fed directly into a coal surge bin 220 from a railcar or truck unloading station (not shown) by a conveyor belt (not shown).

The rotary valve 212 empties coal onto a conveyor 218 that, in part runs underneath the feed hopper 214. In one embodiment, the feed conveyor 218 is New London Feed Conveyor clearing about 34 feet and capable of providing about 6000 pounds per hour of coal; this feed conveyor is manufactured by the New London Engineering Company of 1700 Division Street, New London, Wis. 54961. The feed conveyor 218 carries the coal to a coal surge bin 220 equipped with a coal feed screw 222 at its bottom that is preferably speed controlled and adapted to supply the desired amount of coal at the desired rate to the reactor. In another embodiment, not shown, instead of coal feed screw 222 one could use a rotary valve or lock hoppers if the surge bin was above the reactor. In this embodiment, the coal to fill the surge bin may come directly from a coal receiving facility (not shown). In one embodiment, the coal surge bin 220 is comprised of low level and high level sensors (not shown) that automatically control the rotary valve 212 located underneath the feed hopper 214 in order to maintain a minimum amount of feed coal in the surge hopper. In another embodiment, the coal surge bin 220 level is controlled using a continuous level sensor such as, e.g., an ultrasonic level sensing unit. The feed screw 222 feeds coal via line 224 to fluid bed reactor 226. The fluid bed reactor may be a custom design or a commercially available design e.g. fluid bed reactor model C-FBD-36/72 by Carrier Vibrating Equipment, Inc. PO Box 37070, Louisville, Ky.

In one embodiment, not shown in FIG. 6, prior to the time the coal is fed to reactor 226 it is dried to a moisture content of less than about 40 weight percent and, more preferably, less than about 30 weight percent. The coal may be pre-dried by conventional means including, e.g., rotary kilns (see, e.g., U.S. Pat. No. 5,103,743 of Berg), cascaded whirling bed dryers (see, e.g., U.S. Pat. No. 4,470,878 of Petrovic et al.), elongated slot dryers (see, e.g., U.S. Pat. No. 4,617,744 of Siddoway et al.), hopper dryers (see, e.g., U.S. Pat. No. 5,033, 208 of Ohno et al.), traveling bed dryers (see, e g., U.S. Pat. No. 4,606,793 of Petrovic et al.), vibrating fluidized bed dryers (see, e.g., U.S. Pat. No. 4,444,129 of Ladt) and fluidized-bed dryers or reactors (see, e.g., U.S. Pat. No. 5,537,941 of Goldich, U.S. Pat. No. 5,546,875 of Selle et al., U.S. Pat. No. 5,832,848 of Reynoldson et al. U.S. Pat. Nos. 5,830,246, 5,830,247, and 5,858,035 of Dunlop, U.S. Pat. No. 5,637,336 of Kannenberg et al., U.S. Pat. No. 5,471,955 of Dietz, U.S. Pat. No. 4,300,291 of Heard et al. and U.S. Pat. No. 3,687,431 of Parks) all of which are incorporated by reference herein. The heat source for pre-drying the coal may be of the form of waste heat, other available heat sources, or auxiliary fuels. In one embodiment, the coal is pre-dried to a moisture content of about 12 to about 20 weight percent. In one embodiment, two or more coals, each with different moisture contents, are blended together to provide a raw coal feed with a moisture content of less than about 40 weight percent.

Figure 7:
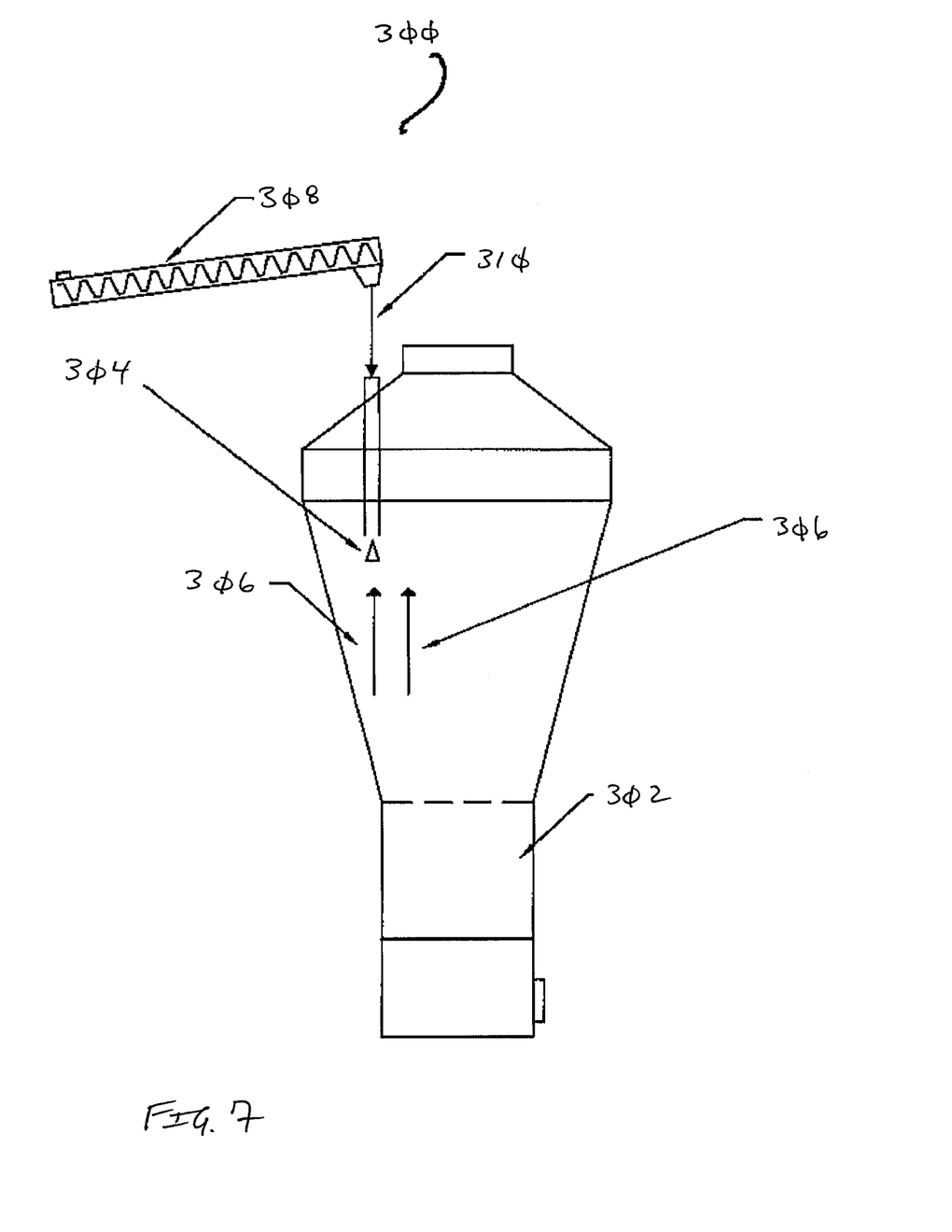
FIG. 7 is a detailed portion of FIG. 6.

In one embodiment, the raw coal is spread with a coal spreader and contacted with, e.g., off-gas from the fluidized bed reactor in order to dry it to the desired moisture content. FIG. 7 is a schematic of an integrated fluid bed and coal pre-dryer system 300 comprised of a fluidized bed 302 and a spreader 304. Here, a feed screw 308 feeds the raw coal via line 310 onto the spreader 304. The spreader 304 distributes the incoming coal so that off gases from the fluidized bed 302 that flow, e.g., in the directions of arrows 306 contact and pre-dry the coal prior to the time it reaches the fluidized bed 302.

Referring again to FIG. 6, the reactor 226 is fluidized, i.e., a fluidized bed is established therein. One may establish such a fluidized bed by conventional means as described above. In one embodiment, the fluidized bed reactor is cylindrical and has an aspect ratio (bed height divided by diameter) of 2 or less; in one embodiment, the aspect ratio ranges from about 6/3 to about 1/3. The bed within the cylindrical fluidized bed reactor preferably has a depth of from about 1 to about 8 feet and, more preferably, from about 2 to about 4 feet. Non-cylindrical fluidized beds also may be used, but in one embodiment, the aspect ratio thereof (the ratio of the bed height to the maximum cross sectional dimension) ranges from about 2/1 to about 1/3. Non-cylindrical fluidized beds may also include enlarged upper sections to facilitate particle disengagement, e.g., fluid bed reactor model C-FBD-36/72 by Carrier Vibrating Equipment, Inc. PO Box 37070, Louisville, Ky. Bed fluidization may be achieved by fluidizing gas that enters the reactor 226 through a perforated plate (not shown). Fresh air is used for fluidizing, but a mixture of fresh air and recycle gas may be used. It is preferred to use one blower to control the amount and the composition of the fluidizing gas. In other embodiments, multiple blowers may be used.

One embodiment employs a startup heater air fan system 228 that provides the air for an in-duct, natural gas-fired burner used for preheating the fluidizing gas during startup. The startup heater air fan system 228 may, e.g., be a blower provided with a burner system that is manufactured by, e.g., Stelter & Brinck, Ltd., 201 Sales Avenue, Harrison, Ohio 45030. In addition, a recycle fan 230 is used to move the fluidized gas in a loop comprised of lines 232, 234, 236, 238, 240, 242, 244, 252, and 254. The recycle fan 230 may be, e.g., a New York Blower. Type HP Pressure Blower manufactured by The New York Blower Company.

A fresh air fan 256 is used to add fresh air to the fluidizing gas in order to adjust the oxygen content of the fluidizing gas. The fresh air fan 256 may, e.g., be a New York Blower Type 2606 Pressure Blower manufactured by The New York Blower Company. In another embodiment, the fan 256 may be replaced with a control valve and a suitable control valve added to line 252. As fresh air is added to the fluidizing gas, a vent valve 264 is used to release an equal amount of gas to the emissions control device 270 to maintain a consistent flow of fluidizing gas through the reactor. In one embodiment, the velocity of the fluidizing gas is less than about 12 feet per second and, preferably, from about 4 to about 9 feet per second. Gases exiting the reactor 226 enter a dust removal device 262 where coal fines are separated; the dust removal device may be, e.g., a Flex-Kleen Pulse Jet Baghouse manufactured by the Flex Kleen Division of the Met Pro Corporation of Glendale Heights, Ill. or a cyclone e.g., manufactured by Fisher-Kloterman, Inc., (a CECO Environmental Company) of 822 South 15th Street, Louisville, Ky. 40210. In another embodiment, there may be multiple fines removal devices to allow coarser dust to be recovered as additional coal product or as a separate product.

Clean gas passes a vent valve 264 where an appropriate amount of gas is vented to an emissions control device 270 and the balance becomes a part of the "closed loop recirculation." The purpose of the emissions control device is to destroy any carbonaceous components in the offgas after removal of particulate. The emissions control device could be, e.g., a thermal oxidizer manufactured by John Zink Company, LLC of 11920 East Apache, Tulsa, Okla. 74116. Alternatively, the emissions control device could be, e.g., a catalytic oxidizer manufactured by Catalytic Product, International of 980 Ensell Road, Lake Zurich, Ill. 60047-1557. The emissions control device could also be a gas turbine where extra fuel is added to the gas to raise the temperature and the gases are then expanded to generate electricity for the plant use or for sale to the utility.

In one embodiment, a typical startup procedure involves, e.g., starting the heater air fan 228 and the recycle fan 230. Recycle fan speed is selected to ensure sufficient gas flow to achieve bed fluidization. Coal feed is started to fill the reactor 226 to the desired bed height. An indication of a full bed is overflow of coal from the reactor 226 to the screw cooler. An in-duct natural gas-fired burner 266 is started, and the temperature of the fluidizing gas is slowly increased. The burner 266 may be, e.g., a Stelter & Brink 2,000,000 btu per hour process air heater. When the coal in the reactor 226 reaches a temperature within the range of about 350 to about 400 degrees Fahrenheit, it begins to release heat as it consumes oxygen present in the fluidizing gas. Small amounts of coal are added to the reactor 226 to maintain a steady rise in the temperature of the fluidized bed. It is preferred that the temperature of the fluidized bed be maintained at about 450 to about 650 degrees Fahrenheit and, more preferably, about 580 to about 620 degrees Fahrenheit. As coal is processed it exits reactor 226 through valve 268 into the cooler 260. Once the fluidized bed reaches the operating temperature, the startup burner is shut down. The reactor 226 is preferably equipped with several water spray nozzles (not shown) to assist in the control the temperature of the fluidized bed. The reactor is also preferably equipped with several temperature sensors to monitor the temperature of the fluidized bed. In case of emergency, dump valve 66 can be actuated to quickly empty the reactor contents into the cooler 260.

The gases leaving the reactor 226 via line 244 have an oxygen content of less than 15 volume percent, whereas the oxygen content of the fluidizing gas is maintained at greater than about 15 volume percent (and, more preferably, closer to that of fresh air) to maximize the rate of coal processing. In one embodiment, the temperature of the fluidized bed is maintained at about 450 to about 650 degrees Fahrenheit and, more preferably, at about 580 to about 620 degrees Fahrenheit. At the preferred steady state conditions, the amount of heat released via the combustion of the coal is balanced by the amount of heat required to heat and dry the coal added to the reactor. As will be apparent, the temperature of the fluidized bed can be controlled by varying the rate of coal feed into the system, by the amount of oxygen supplied to the system through the fluidizing gas and/or by injection of water in the fluidized bed.

The off gas from reactor 226 is run through a particle separation step to remove particles entrained in the reactor offgas. In one embodiment, this step consists of a single baghouse such as baghouse 262 or a cyclone (not shown). In another embodiment, the particle separation step includes multiple devices to facilitate recovery of entrained particles on the basis of particle size or density. Larger particles may be directed to the cooler for recovery as coal product.

Cooling and Stabilizing of the Dried Coal

The coal produced in reactor 226 is typically at a temperature of about 580 to about 620 degrees Fahrenheit, and it typically contains about 0 to about 2 weight percent of moisture. This product is discharged through feeder 268 which may be, e.g., a rotary valve, lock hoppers, to a cooling/rehydration step. This hot, substantially dry coal is then cooled and partially rehydrated in the next step of the process.

The cooling, rehydration and stabilizing step can be applied to coal produced via the process described herein above. Alternatively, or additionally, it can be applied to heated, and partially or fully dried coal produced by other processes. Thus, e.g., one may produce such a heated, partially dried coal using one or more of the processes described in the above-identified patents related to the drying of coal.

The preferred method for cooling, rehydration, and stabilization occurs in one process piece of process equipment 260. This could be a screw conveyor, a rotary drum, rotary tube cooler or any other device that would provide cooling through heat transfer surfaces and or the application of water as well as mixing. This cooler 260 would be equipped with a multiplicity of water sprays and temperature sensors to allow water to be applied to the product for either progressively lowering the temperature of the product to less than the ambient boiling point of water (212 degrees Fahrenheit at sea level) and/or adding about 5 to 12 percent moisture to the product. The application of water may be continuous or intermittent. The control of water application could be on the basis of temperature, the mass flow rate of product and/or a combination thereof. One of skill in the art will appreciate that the apparatus shown in FIG. 5 may generally be employed.

Figure 8:
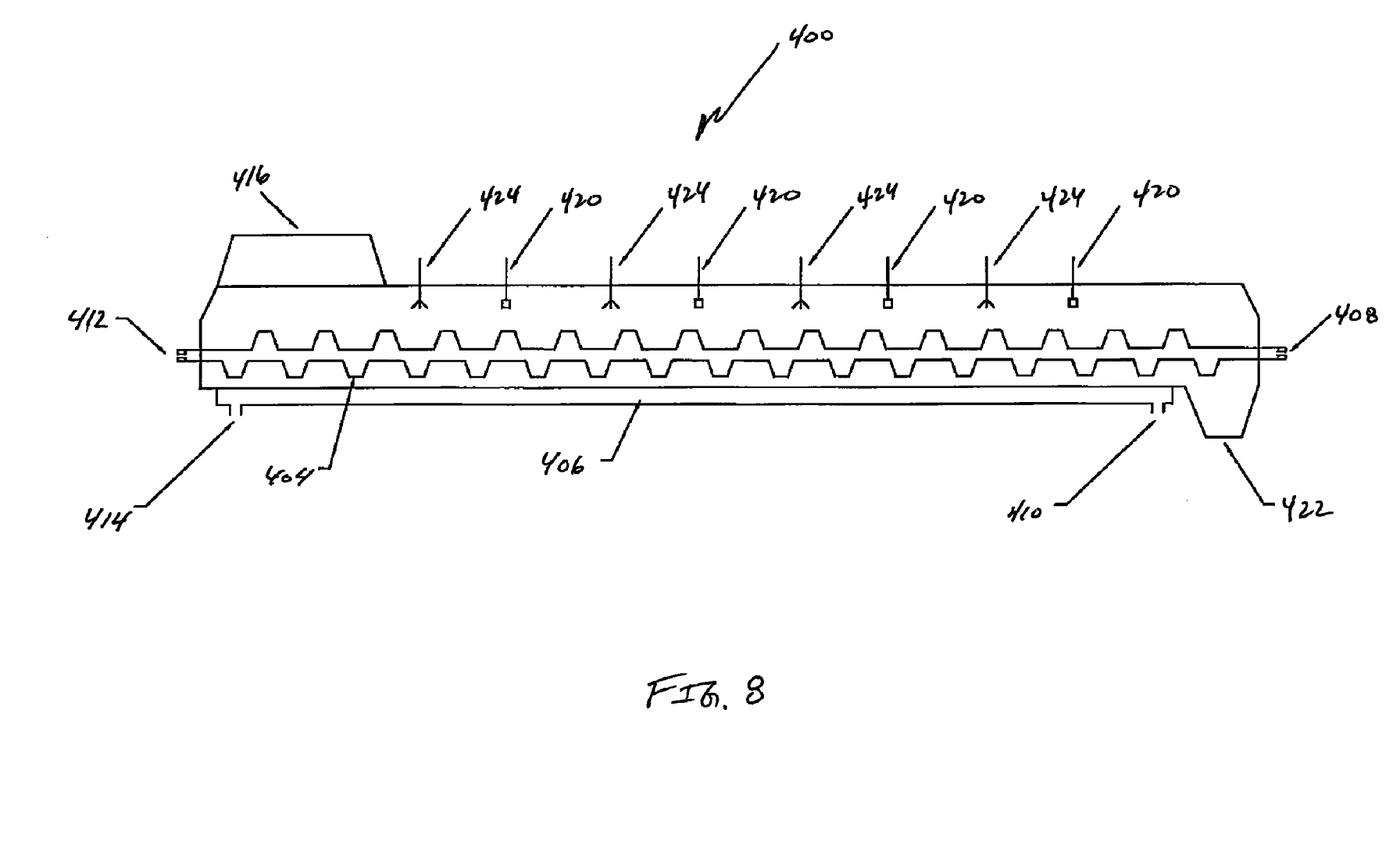
FIG. 8 is a detailed portion of FIG. 6 showing a cooling portion.

In one embodiment, the cooling, rehydration and stabilization device would be a hollow flight screw cooler as manufactured by the Therma-Flite Company of 849 Jackson Street, Benica, Calif. 94510. FIG. 8 is a schematic of a hollow-flight screw cooler 400 that is comprised of a chamber 402, a hollow screw 404 disposed in the center of said chamber, a device for rotating the hollow screw (not shown), a hollow jacket 406 disposed around said chamber, a first cool water inlet port 408, a second cool water inlet 410, a first hot water outlet 412, and a second hot water outlet 414. The rotating screw assembly 404 is comprised of a hollow shaft 418 and a multiplicity of hollow flights 420. Cold water is fed into inlet port 408 and exchanges heat with the material that contacts the flights 420 and the shaft 418. Cold water is also fed into jacket inlet port 410 and exchanges heat with the material that contacts the chamber 402.

Hot and dry coal enters the hollow-flight screw cooler through port 416, and contacts rotating screw assembly 404. As the hot coal contacts the rotating screw assembly 404, it is not only moved from inlet port 416 toward outlet port 422, and during such passage it exchanges heat with the flights 420, shaft 418 and chamber 402 and is also cooled. The hollow-flight screw cooler assembly 400 is comprised of a multiplicity of temperature sensors 420 that are adapted to sense the temperature at various points in the screw assembly. The screw cooler assembly is also comprised of a multiplicity of water sprays 424.

In the cooling, rehydration and stabilization step, the goal is to reduce the temperature of the hot coal received in from the reactor from a temperature of about 580 to about 620 degrees Fahrenheit to a temperature of less than about 250 degrees Fahrenheit using heat exchange surfaces 420, 418 and 402 described above. Using a heat exchange device for the initial cooling slows the rate of heat removal from the product which reduces thermal shock and may improve the mechanical integrity of the product coal. Further cooling of the product to a temperature between about 170 degrees Fahrenheit and about 200 degrees Fahrenheit is obtained using direct application of water using the water sprays 424. The direct application of water also enhances the stability of the product by restoring the moisture content of the coal to equilibrium moisture content, a value typically in the about 6 to 12 weight percent range.

The multiplicity of temperature sensors and/or the mass flow rate of the product are used to control the water sprays 424. The temperature sensors may also be used as a part of the overall process control. For example, if the rate of temperature decrease in the hollow-flight screw cooler is too low, and/or too high, the rate may be modified by modifying the coal feed rate into the system, and/or by modifying the rate at which the screw turns and/or the rate at which cooling water is circulated and/or the rate at which water is applied using the sprays. The water is preferably sprayed onto the coal after it has reached a temperature of less than about 250 degrees Fahrenheit. The water spray may be continuous, and/or it may be intermittent. In one preferred embodiment, water is introduced only in the last half of the hollow-flight screw cooler assembly 400.

The water sprayed into the system has at least two functions. The first is to cool the coal by transferring heat from the coal to the water and possibly vaporizing some of the water. The second function of the sprayed water is to rehydrate the coal until it preferably contains about 6 to about 12 weight percent of moisture. By rehydrating the coal in the hollow-flight screw cooler, the applicants claim to restore the coal to a state such that when stored in an open-air coal pile, further moisture pick-up is either slowed or eliminated. The rehydration step in that regard pacifies the processed coal against further hydration. The water so introduced preferably reduces the temperature of the coal to less than 212 degrees Fahrenheit. In one preferred embodiment, water is introduced only in the last half of the hollow-flight screw cooler assembly such that the coal at the outlet port 422 is at less than 180 degrees Fahrenheit.

Referring again to FIG. 6, the cooled rehydrated and stabilized coal from cooler 260 is discharged via line 270 to conveyor 272. The conveyor 272 conveys the dried rehydrated stable coal to a storage system 274 (not shown), a load out system for trucks or railcars, or directly to the end user. Any gases emitted in the hollow-flight screw cooler are directed to the emissions control device 270.

Properties of the Coal Produced in One Embodiment of the System

In one embodiment, the coal produced in the process of the invention shown in FIGS. 6-8 contains about 36 to about 39 weight percent of volatile matter and about 50 to about 65 weight percent of fixed carbon, and such coal has a heating value of about 9,300 to about 11,000 btu (British thermal units) per pound. The coal produced in the process of the invention preferably contains about 6 to about 12 weight percent of moisture. It is "irreversibly dried," i.e., its equilibrium moisture is reduced from the native coal which reduces its tendency to absorb moisture. The coal is stabilized wherein 50 to 100 percent of the equilibrium moisture is added back to the dry coal product to minimize the reaction rate and heat generation associated with moisture absorption.

The Use of a Vibrating Fluidizing Bed

In one embodiment, a vibrating fluidizing bed is utilized in assembly 10. This type of fluidizing bed is well known to those skilled in the art and is described, e.g., in U.S. Pat. No. 4,444,129 (the '129 patent), the entire disclosure of which is hereby incorporated by reference into this specification. The '129 patent discloses a process for drying wet coal fines smaller than 28 mesh in size that employs both a vibrating fluidized bed type dryer and a coal fired burner for supplying hot drying gases to the dryer. In the apparatus used in this process, a regenerative separator is interposed between the coal fired burner and the fluidized bed type dryer to satisfactorily remove particle matter from the gases without unacceptable pressure losses. Hot gases exhausted from the fluidized bed type dryer are also cleansed to remove particulate coal particles which are used as fuel for the coal fired burner.

For example, in one embodiment a method of drying fine coal particles smaller than approximately 28 mesh in size is employed wherein gases are heated by a coal fueled burner. The heated gases are passed through a regenerative separator to remove substantially all particulate ash particles therefrom to prevent ignition of the coal particles. The passing coal particles are passed from an inlet to an outlet of a fluidized bed type dryer wherein the gases from the regenerative separator are directed through the fluidized bed dryer to dry the coal particles as they are passed therethrough. The dried coal particles are collected for future use as fuel and the bulk of the gases are recirculated to the burner prior to passing the gases through the regenerative separator, gases not recirculated being limited to that amount required to discharge water equivalent to that removed from the coal stream to be dried. In one embodiment, passing the heated gases through the regenerative separator includes providing rotational movement to the gases by intersecting curved blades positioned in the path of the heated gases, and removing the ash particles during the rotation of the gases through the side of the separator. Further, at least a portion of the gases to collect particulate coal exhausted from the dryer and utilizing the collected particulate coal to fuel the coal fueled burner. In addition, at least some of the coal particles from gas exhausted from the dryer for mixing with dry coal paths delivered through the outlet of the dryer. The rotational movement of the gases may also be stopped in the regenerative separator before entry into the fluidized bed dryer, by intersecting blades curved in the opposite direction from the rotation.

Referring again to FIG. 6, in the system 210, fluidizing gas may be introduced into the fluidized bed reactor 226 (and, in particular, into the fluidized bed thereof) at a fluidizing velocity in the reactor vessel of greater than about 4 feet per second and, more preferably, greater than about 5 feet per second. In one aspect of this embodiment, the fluidizing gas is introduced at a fluidizing velocity of about 5 to about 8 feet per second. In another aspect of this embodiment, the fluidizing gas is introduced at a fluidizing velocity of about 6 to about 8 feet per second. In one embodiment, the fluidized bed reactor 226 is a cylindrical reactor that may be heated by conventional means such as, e.g., using hot air provided in another reactor (not shown) and/or another device. The fluidized bed 214 is preferably maintained at a temperature of about 150 to about 200 degrees Fahrenheit. In a more preferred embodiment, the fluidized bed 214 is maintained at a temperature of about 165 to about 185 degrees Fahrenheit. Various means may be used to maintain the temperature of fluidized bed at its desired temperature. Thus, e.g., one may use an internal or external heat exchanger (not shown). See, e.g., U.S. Pat. Nos. 5,537,941, 5,471,955, 5,442,919, 5,477,850, 5,462,932, and the like which are incorporated by reference herein. In another embodiment, not shown, hot fluidizing gas from a heat exchanger may be fed to fluidized bed reactor 226. One may use an internal or external heat exchanger (not shown). See, e.g., U.S. Pat. Nos. 5,537,941, 5,471,955, 5,442,919, 5,477,850, 5,462,932, and the like which are hereby incorporated by reference herein.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A multistage process for drying coal, comprising:
   (a) charging coal to a first fluidized bed reactor, charging air to said first fluidized bed reactor at a velocity of from about 5 to about 8 feet per second, subjecting said coal to a first temperature of from about 300 to about 550 degrees Fahrenheit, and removing from about 40 to about 60 weight percent of the water in said coal from said coal, wherein:
i. said coal charged to said first fluidized bed reactor has a moisture content of from about 15 to about 40 percent and a combined oxygen content of from 10 to about 25 percent,
ii. said first fluidized bed reactor is comprised of a fluidized bed with a fluidized bed density of from about 20 to about 50 pounds per cubic foot, whereby a first, partially dried coal is produced;
(b) feeding said first, partially dried coal into a second fluidized bed reactor, feeding air into said second fluidized bed, subjecting said coal to a second temperature to about 250 degrees Fahrenheit, and removing water from said dried coal until no more than about 1 weight percent of water remains in said coal,
(c) feeding said dried coal into a cooler where it is cooled to a temperature less than about 212 degrees Fahrenheit and mixed with water, said cooler employs at least one of a screw conveyor and a rotary tube.

2. The process of claim 1, further comprising the step of simultaneously feeding air into said first fluidized bed reactor and maintaining said first fluidized bed at a density of from about 20 to about 50 pounds per cubic foot while removing water from said first fluidized bed reactor.

3. The process of claim 2, wherein said air fed into said first fluidized bed reactor is at a temperature of from about 250 to about 400 degrees Fahrenheit.

4. The process of claim 2, wherein said air fed into said first fluidized bed reactor is at said first temperature of from about 300 to about 350 degrees Fahrenheit.

5. The process of claim 2, wherein said air is fed into said first fluidized bed reactor at a velocity of from about 5 to about 8 feet per second.

6. The process of claim 1, wherein said coal charged to said first fluidized bed reactor is 2"×0" coal.

7. The process of claim 1, wherein said coal charged to said first fluidized bed reactor is selected from the group consisting of lignitic coal, sub-bituminous coal, bituminous coal, and mixtures thereof.

8. The process of claim 1, wherein said coal in said first fluidized bed reactor is maintained at said first temperature of from about 400-650 degrees Fahrenheit.

9. The process of claim 1, wherein said fluidized bed is maintained at a fluidized bed density of from about 20 to about 40 pounds per square inch.

10. The process of claim 1, wherein said fluidized bed is maintained at a fluidized bed density of from about 20 to about 30 pounds per square inch.

11. The process of claim 1, further comprising the step of heating said air prior to the time it is fed into said first fluidized bed reactor.

12. The process of claim 11, wherein said air is heated by a heat exchanger prior to the time it is fed into said first fluidized bed reactor.

13. The process of claim 1, further comprising the step of removing coal particles with a particle size less than about 400 microns from said first fluidized bed reactor.

14. The process of claim 13, wherein said coal particles with a particle size less than about 400 microns that have been removed from said first fluidized bed reactor are fed into a cyclone.

15. The process of claim 1, further comprising the step feeding gas into said second fluidized bed reactor.

16. The process of claim 15, wherein the coal is partially oxidized to provide process heat and reduce the equilibrium moisture of the coal.

17. The process of claim 1, wherein said cooler comprises at least one water sprays and at least one temperature sensors to allow water to be applied to the coal for at least one of progressively lowering the temperature of the coal to less about 200 degrees Fahrenheit and adding about 5 to 12 percent moisture to the coal.

18. The process of claim 17 wherein the application of water is continuous.

19. The process of claim 17 wherein the application of water is intermittent.

20. A continuous process for drying and reducing the equilibrium moisture of coal, comprising:
a. charging the coal to a fluidized bed reactor, supplying air to the fluidized bed reactor, subjecting the coal to a temperature of about 450 to about 650 degrees Fahrenheit, drying the coal to a moisture content of less than about 2 percent by weight, and reducing the equilibrium moisture content of the coal to a range of about 6 to about 12 percent to produce a dried coal product; and
b. feeding the dry coal product from the fluidized bed reactor to a cooler where the product is cooled to less than about 212 degrees Fahrenheit and about 5 to about 12 percent by weight of water is added to satisfy the equilibrium moisture of the product, said cooler employs at least one of a screw conveyor and a rotary tube.

21. The process of claim 20, comprising the step of simultaneously feeding air and coal into the fluidized bed reactor, maintaining a density of about 20 to about 50 pounds per cubic feet while removing moisture and reducing the equilibrium moisture of the coal.

22. The process of claim 21, wherein said air is at ambient temperature.

23. The process of claim 21, wherein said coal is at ambient temperature.

24. The process of claim 21, wherein said air is fed into the fluidized bed reactor to maintain a velocity of about 4 to about 9 feet per second.

25. The process of claim 20, wherein the coal charged to the fluidized bed reactor is about 3"×0" coal.

26. The process of claim 20, wherein the coal charged to the fluidized bed reactor is selected from the group consisting of lignite coal, sub-bituminous coal, and bituminous coal and mixtures thereof.

27. The process of claim 20, wherein the fluidized bed reactor is maintained at a temperature of about 450 to about 650 degrees Fahrenheit.

28. The process of claim 20, wherein the product from the fluidized bed reactor is fed to a cooler where water is applied to the product reducing the temperature from about 450 to 650 degrees Fahrenheit to a temperature less than 212 degrees Fahrenheit and sufficient excess water is added to rehydrate the product to about 5 to about 12 percent by weight of water.

29. The process of claim 27 wherein water is added to satisfy the reduced equilibrium moisture of the product reducing its tendency to reheat through the absorption of moisture after cooling.

30. The process of claim 1 wherein said cooler employs a water spray that that is used to cool the dried coal, said water spray being controlled by a rotary valve.

31. The process of claim 30 wherein the cooler employs said screw conveyor that further cools the coal that has been exposed to the water spray.

32. The process of claim 30 wherein said water spray is continuous.

33. The process of claim 30 wherein said rotary valve is indexed to open a solenoid valve to inject water.

* * * * *